United States Patent
Brittles et al.

(10) Patent No.: US 10,971,274 B2
(45) Date of Patent: Apr. 6, 2021

(54) TOROIDAL FIELD COIL ARRANGEMENT WITH CENTRAL COLUMN HAVING EXFOLIATED HTS TAPES AND RETURN LIMBS HAVING SUBSTRATED HTS TAPES

(71) Applicant: Tokamak Energy Ltd., Abingdon (GB)

(72) Inventors: Greg Brittles, Abingdon (GB); David Kingham, Oxford (GB); Robert Slade, Abingdon (GB)

(73) Assignee: Tokamak Energy Ltd., Oxfordshire (GB)

( * ) Notice: Subject to any disclaimer, the term of this patent is extended or adjusted under 35 U.S.C. 154(b) by 0 days.

(21) Appl. No.: 16/640,664

(22) PCT Filed: Aug. 20, 2018

(86) PCT No.: PCT/GB2018/052355
§ 371 (c)(1),
(2) Date: Feb. 20, 2020

(87) PCT Pub. No.: WO2019/038526
PCT Pub. Date: Feb. 28, 2019

(65) Prior Publication Data
US 2020/0335230 A1 Oct. 22, 2020

(30) Foreign Application Priority Data
Aug. 21, 2017 (GB) ..................................... 1713387

(51) Int. Cl.
*G21B 1/05* (2006.01)
*H01F 6/02* (2006.01)
*H01F 6/06* (2006.01)

(52) U.S. Cl.
CPC .............. *G21B 1/057* (2013.01); *H01F 6/02* (2013.01); *H01F 6/06* (2013.01)

(58) Field of Classification Search
CPC .............. H01F 6/02; H01F 6/06; G21B 1/057
(Continued)

(56) References Cited

U.S. PATENT DOCUMENTS

2016/0232988 A1 8/2016 Sykes et al.
2020/0091702 A1* 3/2020 Noonan ................. G21B 1/057

FOREIGN PATENT DOCUMENTS

GB 2519827 A 5/2015
WO 2017042543 A1 3/2017
(Continued)

OTHER PUBLICATIONS

Search Report issued from the United Kingdom for related Application No. GB1713387.7 dated Feb. 15, 2018 (3 pages).
(Continued)

*Primary Examiner* — Jack W Keith
*Assistant Examiner* — Daniel Wasil
(74) *Attorney, Agent, or Firm* — Michael Best & Friedrich LLP

(57) ABSTRACT

There is disclosed a toroidal field coil for use in a spherical tokamak. The toroidal field coil comprises a central column and a plurality of return limbs. The central column comprises a plurality of exfoliated HTS tapes, and the return limbs comprise a plurality of substrated HTS tapes. Each exfoliated HTS tape comprises a ReBCO layer bonded to respective metal interface layers on each side of the ReBCO layer, each metal interface layer being bonded to a metal stabiliser layer. Each substrated HTS tape comprises a ReBCO layer bonded on one side to a metal interface layer and on the other side to an oxide buffer stack, the metal interface layer being bonded to a metal stabiliser layer and the oxide buffer stack being bonded to a substrate.

3 Claims, 1 Drawing Sheet

(58) Field of Classification Search
USPC .......................................................... 376/133
See application file for complete search history.

(56)        References Cited

FOREIGN PATENT DOCUMENTS

WO         2018078326  A1     5/2018
WO         2018078327  A1     5/2018

OTHER PUBLICATIONS

International Search Report with Written Opinion for related Application No. PCT/GB2018/052355 dated Oct. 26, 2018 (12 pages).
Solovyov et al, "Exfoliated YBCO filaments for second-generation superconducting cable" Superconductor Science and Technology vol. 30, No. 1, Nov. 15, 2016 (Bristol), pp. 1 to 9.
Search Report issued by the Federal Institute of Industrial Property for Application No. 2020111454/04 dated May 15, 2020 (2 pages).
International Preliminary Report on Patentability for related Application No. PCT/GB2018/052355 dated Feb. 25, 2020 (12 pages).

\* cited by examiner

TOROIDAL FIELD COIL ARRANGEMENT WITH CENTRAL COLUMN HAVING EXFOLIATED HTS TAPES AND RETURN LIMBS HAVING SUBSTRATED HTS TAPES

FIELD OF THE INVENTION

The present invention relates to nuclear fusion reactors. In particular the present invention relates to a toroidal field coil for use with nuclear fusion reactor including a tokamak plasma vessel.

BACKGROUND

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a critical temperature (the temperature above which the material cannot be superconducting even in zero magnetic field) below about 30K. The behaviour of HTS material is not described by BCS theory, and such materials may have critical temperatures above about 30K (though it should be noted that it is the physical differences in superconducting operation and composition, rather than the critical temperature, which define HTS material). The most commonly used HTS are "cuprate superconductors"— ceramics based on cuprates (compounds containing a copper oxide group), such as BSCCO, or ReBCO (where Re is a rare earth element, commonly Y or Gd). Other HTS materials include iron pnictides (e.g. FeAs and FeSe) and magnesium diborate ($MgB_2$).

ReBCO is typically manufactured as tapes, with a structure as shown in FIG. 1. Such tape 500 is generally approximately 100 microns thick, and includes a substrate 501 (typically electropolished hastelloy approximately 50 microns thick), on which is deposited by IBAD, magnetron sputtering, or another suitable technique a series of buffer layers known as the buffer stack 502, of approximate thickness 0.2 microns. An epitaxial ReBCO-HTS layer 503 (deposited by MOCVD or another suitable technique) overlays 15 the buffer stack, and is typically 1 micron thick. A 1-2 micron silver layer 504 is deposited on the HTS layer by sputtering or another suitable technique, and a copper stabilizer layer 505 is deposited on the tape by electroplating or another suitable technique, which often completely encapsulates the tape.

The substrate 501 provides a mechanical backbone that can be fed through the manufacturing line and permit growth of subsequent layers. The buffer stack 502 is required to provide a biaxially textured crystalline template upon which to grow the HTS layer, and prevents chemical diffusion of elements from the substrate to the HTS which damage its superconducting properties. The silver layer 504 is required to provide a low resistance interface from the REBCO to the stabiliser layer, and the stabiliser layer 505 provides an alternative current path in the event that any part of the ReBCO ceases superconducting (enters the "normal" state).

SUMMARY

In accordance with the present invention there is provided a toroidal field coil for use in a spherical tokamak. The toroidal field coil comprises a central column and a plurality of return limbs. The central column comprises a plurality of exfoliated HTS tapes, and the the return limbs comprise a plurality of substrated HTS tapes. Each exfoliated HTS tape comprises a ReBCO layer bonded to respective metal interface layers on each side of the ReBCO layer, each metal interface layer being bonded to a metal stabiliser layer. Each substrated HTS tape comprises a ReBCO layer bonded on one side to a metal interface layer and on the other side to an oxide buffer stack, the metal interface layer being bonded to a metal stabiliser layer and the oxide buffer stack being bonded to a substrate.

Each metal interface layer may be formed from silver. Each metal stabiliser layer may be formed from copper, aluminium, silver, stainless steel or brass.

In one embodiment, each return limb comprises a quenchable section, the quenchable section comprising substrated HTS tapes and heaters laid adjacent to the substrated HTS tapes.

DETAILED DESCRIPTION

Figure 1:
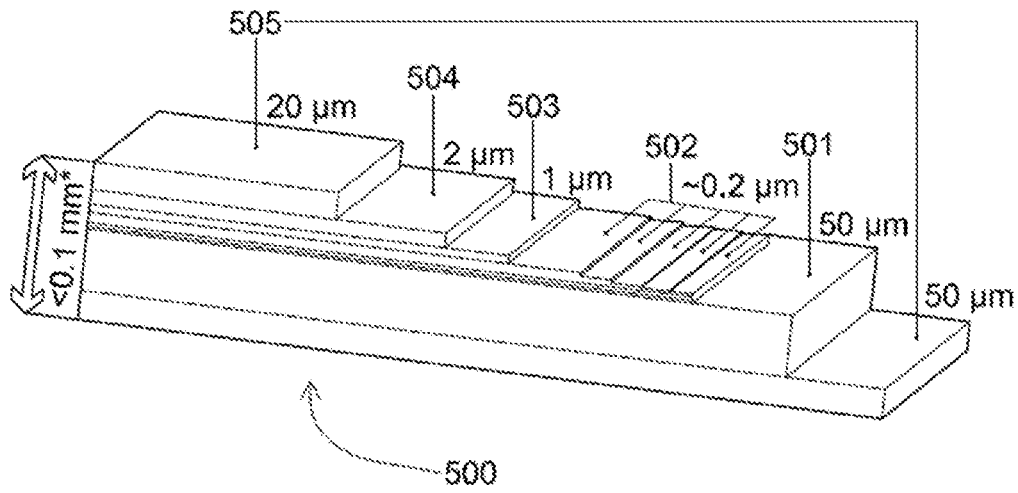
FIG. 1 shows the structure of a "substrated" ReBCO tape.
Figure 3:
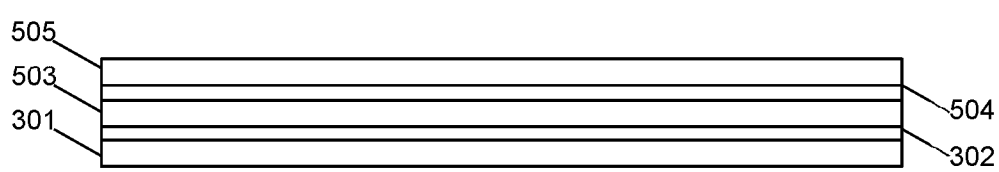
FIG. 3 shows the structure of an "exfoliated ReBCO tape.

Recent advances in the manufacture of ReBCO tapes have allowed long sections of ReBCO to be "exfoliated" i.e. removed intact from the substrate layer. The resulting exfoliated ReBCO, as shown in FIG. 3, can be coated with silver 302 on the side which was previously attached to the substrate, and a second stabiliser layer 301 (e.g. copper, brass, aluminium, silver, or stainless steel) attached to the silver on that side (or the silver-coated ReBCO can be encapsulated within the stabiliser) to form an "exfoliated HTS tape". Other reference numerals in FIG. 3 represent the corresponding elements of FIG. 1—i.e. the HTS layer 503, the silver layer 504, and the stabiliser layer 505. Since the electrical resistance of the stabiliser will generally be significantly less than that of suitable substrate materials (e.g. hastelloy), where many tapes are arranged in a stack or cable, current transfer between exfoliated HTS tapes can be significantly greater than for "substrated" HTS tape (i.e. conventional HTS tape having a substrate) with the same cross section. This can lead to reduced likelihood of quench propagation in a stack and thus improved stability. Alternatively, exfoliated HTS tape providing equivalent stability to substrated HTS tape can be made with a smaller cross section, allowing significantly greater current density in a cable made from exfoliated HTS tape.

Figure 2:
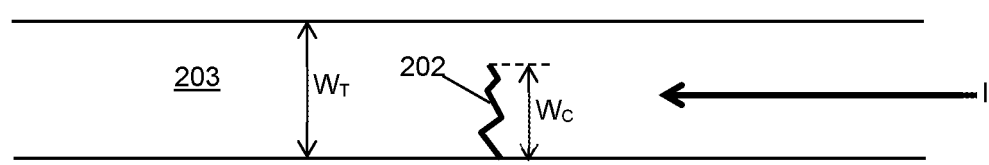
FIG. 2 is an illustration of the ReBCO layer of a tape.

FIG. 2 is a schematic illustration of a ReBCO layer 203 of a tape having a flaw 202, which extends part-way across the tape. The flaw may be a crack, a crystal defect, a chemical defect, or some other flaw in the tape which causes a small region to become normal (i.e. non-superconducting). Through modelling, it has been found that, where the width $W_C$ of an individual flaw 202 is (100−X) % of the width $W_T$ of the ReBCO layer 203, there is no escape of current from the ReBCO into an adjacent layer if the current I is less than X % of the critical current $I_C$, i.e. there is no current escape if $(W_T-W_C)/W_T < I/I_C$. For greater current values, some proportion of the current will escape into the stabiliser layer. The distance along the tape over which the current escapes into the copper is dependent on the ratio between $I/I_C$ and $(W_T-W_C)/W_T$: where the current ratio is close to the flaw width ratio, the current will escape over a longer distance, and as the current ratio increases, the distance over which the current escapes decreases. For substrated HTS tape, the current escape will primarily occur into the stabiliser layer, with very little current escaping into the relatively high resistance substrate. With exfoliated HTS tape, as there is a stabiliser layer both sides of the tape having a low electrical resistance, the current can escape on both sides. This means that the resistance experienced by the escaping current is lower, and the losses due to current escape are reduced compared to substrated HTS tape. This acts to reduce localised heating effects and thus enhance stability.

Where multiple layers of exfoliated HTS tape are stacked or otherwise combined to form a cable, the current which escapes from one tape due to a crack may be transferred to other tapes in the cable, and the tapes will tend to share current so as to minimise the overall resistance of the cable. As such, the benefit in using exfoliated tape is that the density of ReBCO within the cable can be much higher and allows the full current capacity of all HTS tapes in the cable to be employed.

Figure 4:
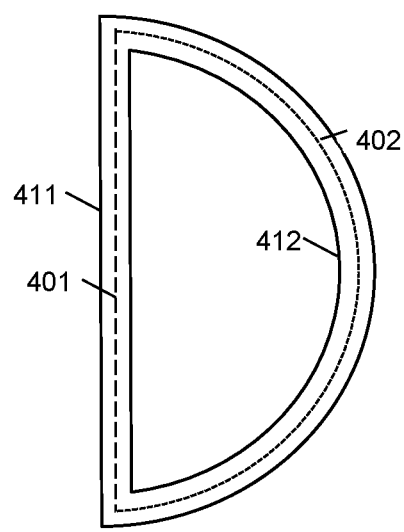
FIG. 4 shows a schematic illustration of a toroidal field coil.

For the toroidal field coil of a spherical tokamak reactor, such as the one shown schematically in FIG. 4, the use of exfoliated HTS tape 401 in the central column 411 allows the current density in the central column to be significantly greater than can be achieved with substrated HTS tape. In the return limbs 412, there are fewer advantages to using exfoliated HTS tape (as current density in the return limbs is not an important design factor), and so substrated tape 402 may be used.

The return limbs may be used in a quench protection system, where the return limbs have "quenchable sections", which are deliberately quenched if a quench is detected anywhere in the magnet, so that the energy of the magnet is dumped into the stabiliser of the return limbs, warming the conductor up. This is described in patent application no. GB1703132.9. In order to effectively dump energy from the magnet, the quenchable sections 122 must have a resistance when not superconducting ("normal resistance") high enough to reduce the current in the magnet quickly, and a heat capacity high enough to absorb the magnet's stored energy, certainly without melting, and preferably without rising much above room temperature, or most preferably above 200° C. The hot-spot temperature at the original quench will be determined by the normal resistance of the quenchable sections (which is in part determined by the resistivity of the materials chosen), and the maximum temperature of the superconductor in the quenchable sections will be determined primarily by the heat capacity of the quenchable sections. Since the length of the quenchable sections will be somewhat constrained to avoid the use of heaters in the central column, where space is restricted, these are conflicting requirements. The heat capacity can be increased by increasing the cross section of the quenchable section (e.g. by increasing the cross section of non-superconducting stabiliser in the quenchable section), but this would also reduce the normal resistance.

For such quenchable sections, the substrate in substrated HTS tape is actually an advantage, as typical materials for the substrate (e.g. hastelloy) have a higher ratio of resistivity to volumetric heat capacity than does copper. Furthermore, substrated HTS tape is likely to be cheaper and obtainable in longer lengths than exfoliated HTS tape, even as manufacturing methods for exfoliated HTS tape improve, so there are still advantages to using it in the return limbs even if the quench protection system outlined above is not used.

It would therefore be advantageous to provide a toroidal field coil for a spherical tokamak where the central column comprises exfoliated HTS tape, and the return limbs comprise substrated HTS tape.

The invention claimed is:

1. A toroidal field coil for use in a spherical tokamak, the toroidal field coil comprising a central column and a plurality of return limbs,
   the central column comprising a plurality of exfoliated high temperature superconductor (HTS) tapes;
   the return limbs comprising a plurality of substrated HTS tapes;
   wherein:
   each exfoliated HTS tape comprises a rare earth barium copper oxide (ReBCO) layer bonded to respective metal interface layers on each side of the ReBCO layer, each metal interface layer being bonded to a metal stabiliser layer, and
   each substrated HTS tape comprises a ReBCO layer bonded on one side to a metal interface layer and on the other side to an oxide buffer stack, the metal interface layer being bonded to a metal stabiliser layer and the oxide buffer stack being bonded to a substrate.

2. A toroidal field coil according to claim 1, wherein each metal interface layer is formed from silver.

3. A toroidal field coil according to claim 1, wherein each metal stabiliser layer is formed from copper, aluminium, silver, stainless steel or brass.

* * * * *